(12) United States Patent
Johnson

(10) Patent No.: US 11,279,348 B2
(45) Date of Patent: Mar. 22, 2022

(54) SAFETY, SECURITY AND CONTROL SYSTEM FOR VEHICLE

(71) Applicant: Boyd Johnson, Pompano Beach, FL (US)

(72) Inventor: Boyd Johnson, Pompano Beach, FL (US)

( * ) Notice: Subject to any disclaimer, the term of this patent is extended or adjusted under 35 U.S.C. 154(b) by 104 days.

(21) Appl. No.: 16/541,362

(22) Filed: Aug. 15, 2019

(65) Prior Publication Data

US 2020/0055518 A1 Feb. 20, 2020

Related U.S. Application Data

(60) Provisional application No. 62/775,111, filed on Dec. 4, 2018.

(51) Int. Cl.
| | |
|---|---|
| *B60W 30/09* | (2012.01) |
| *G05D 1/00* | (2006.01) |
| *B60W 40/08* | (2012.01) |
| *B60W 10/06* | (2006.01) |
| *B60W 10/10* | (2012.01) |
| *B60W 10/18* | (2012.01) |
| *B60W 50/08* | (2020.01) |

(Continued)

(52) U.S. Cl.
CPC ............ *B60W 30/09* (2013.01); *B60W 10/06* (2013.01); *B60W 10/10* (2013.01); *B60W 10/18* (2013.01); *B60W 40/08* (2013.01); *B60W 50/08* (2013.01); *G05D 1/0088* (2013.01); *B60W 2040/0827* (2013.01); *B60W 2040/0836* (2013.01); *B60W 2050/0071* (2013.01); *B60W 2420/42* (2013.01); *B60W 2540/26* (2013.01); *B60W 2556/60* (2020.02); *B60W 2710/06* (2013.01); *B60W 2710/10* (2013.01); *B60W 2710/18* (2013.01); *B60W 2720/106* (2013.01); *B60W 2756/10* (2020.02); *G06N 20/00* (2019.01)

(58) Field of Classification Search
CPC ..................................................... B60W 30/09
See application file for complete search history.

(56) References Cited

U.S. PATENT DOCUMENTS

| | | | | |
|---|---|---|---|---|
| 6,226,389 B1 * | 5/2001 | Lemelson | ............ | G07C 5/0891 |
| | | | | 382/104 |
| 8,954,252 B1 * | 2/2015 | Urmson | ................ | G08G 1/167 |
| | | | | 701/70 |

(Continued)

FOREIGN PATENT DOCUMENTS

| | | | |
|---|---|---|---|
| CN | 103895514 B | * | 8/2016 |
| JP | 2008018772 a | * | 1/2018 |

*Primary Examiner* — Jean Paul Cass
(74) *Attorney, Agent, or Firm* — Barry Choobin; Patent 360

(57) ABSTRACT

The present invention is directed to a safety and security system for vehicles. The safety and security system include a computing unit mounted in a vehicle; one or more optical sensors in electronic communication with the computing unit, the optical sensors are configured for facial recognition and are positioned in the vehicle to capture a face and head movements of a driver. The computing unit equipped with the facial recognition technology and artificial intelligence determined the electiveness of the driver. In case the driver is inattentive, the safety and security system warn the driver and takes any precautionary measure, such as slowing down the speed of the vehicle.

15 Claims, 1 Drawing Sheet

(51) Int. Cl.
*G06N 20/00* (2019.01)
*B60W 50/00* (2006.01)

(56) References Cited

U.S. PATENT DOCUMENTS

| | | | |
|---|---|---|---|
| 9,000,907 B1* | 4/2015 | Rembach | B60N 2/28 |
| | | | 340/457 |
| 10,556,581 B2* | 2/2020 | Soifer | B60W 10/30 |
| 2007/0143482 A1* | 6/2007 | Zancho | H04M 1/72448 |
| | | | 709/227 |
| 2018/0284767 A1* | 10/2018 | Minegishi | B60W 60/0055 |
| 2019/0176837 A1* | 6/2019 | Williams | B60W 50/02 |

* cited by examiner

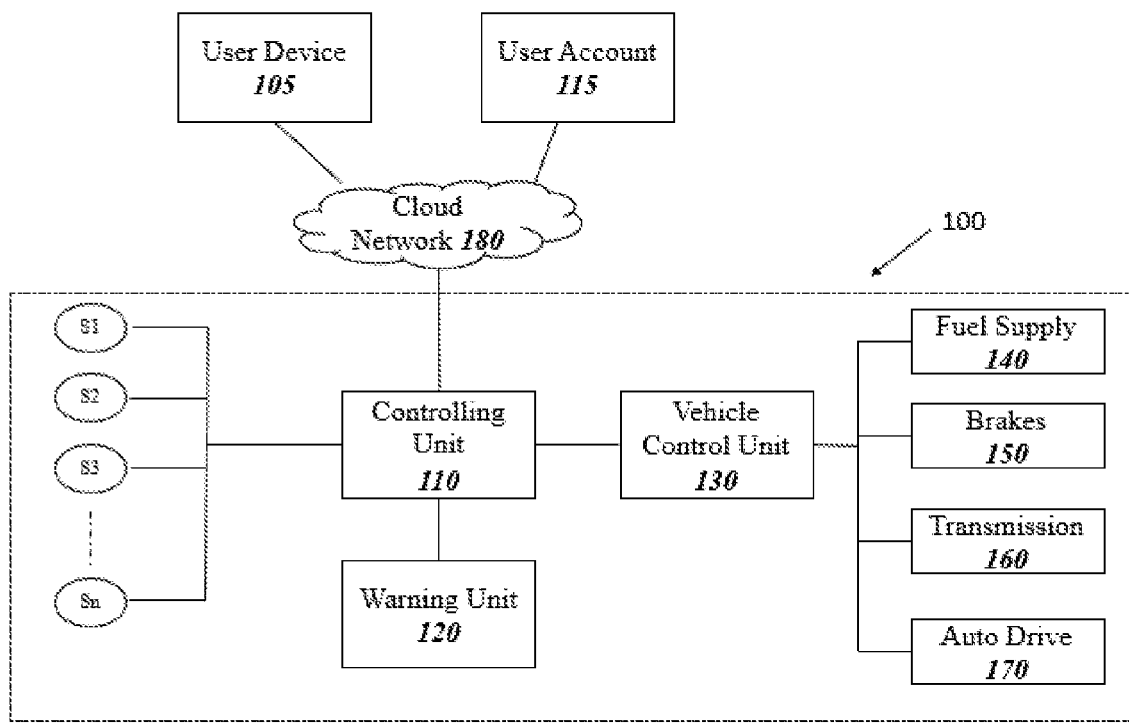

SAFETY, SECURITY AND CONTROL SYSTEM FOR VEHICLE

CROSS-REFERENCE TO RELATED APPLICATIONS

This application claims the benefit of U.S. Provisional Application No. 62/775,111, entitled "Facial Recognition Safety System for Vehicles" filed Dec. 4, 2018, the contents of which are incorporated herein by reference in their entireties and for all purposes.

FIELD OF INVENTION

The present invention relates to a safety and security system for vehicles, and in particular, relates to a system for monitoring distractions of the driver, safety of child left in the vehicle, security of the vehicle from theft, assistance in case of any accidents and controlling accessories of the vehicle.

BACKGROUND

Distracted driving is one of the primary causes of accidents around the world. According to several studies conducted in the United States, distracted driving has been found to be the number-one cause of road accidents. Each day approximately 9 people are killed and more than 1,000 are injured in crashes that are reported to involve a distracted driver. There could be myriad of reasons for the distraction of the driver, such as eating, gazing off, texting, attending a call, talking to other occupants or drowsiness. Drowsiness is one of the major reasons for distraction. A sleepy driver is unable to focus continuously on the road.

Apart from distracted driving, alcohol-impaired driving is also a major cause of accidents. Every day, approximately 29 people in the United States die in motor vehicle accidents accounting for 25% of all the traffic-related deaths in the United States. In 2016, more than one million drivers were arrested for driving under the influence of alcohol or narcotics. Thus, it can be concluded that the lack of attentiveness while driving is the principal cause of road accidents.

Increasing cases of death of children unintentionally left in a car is another concern. The problem is particularly severe in hot areas where the death is due to heat stroke. In 2018 alone, 52 such cases have been reported in the United States. Till mid-2019, an estimated 15 deaths have been reported due to heat stroke. Inside the car, the temperature can increase to extremely dangerous levels. For example, 3-year-old boy in a minivan was found dead and the temperature of the minivan had reached 90 degrees.

Sometimes, the accidents are unavoidable. However timely tracking/reporting of such accidents could save lives.

Thus, in view of the increasing number of accidents, a need is appreciated for a safety and security system for a vehicle to avert the accidents caused by distraction or when the driver fails to pay proper attention while driving. Moreover, such a system helps in reporting/tracking of the vehicle in case of an accident.

BRIEF DESCRIPTION OF THE DRAWINGS

The accompanying FIGURES, which are incorporated herein, form part of the specification and illustrate embodiments of the present invention. Together with the description, the FIGURES further serve to explain the principles of the present invention and to enable a person skilled in the relevant arts to make and use the invention.

FIG. 1 is a block diagram showing the safety and security system, in accordance with an embodiment of the present invention.

SUMMARY OF THE INVENTION

It is, therefore, a principal objective of the present invention to provide a safety and security system for a vehicle that could make driving a lot safer.

An additional objective of the present invention is that the safety and security system alert the driver of a distraction.

Still an additional objective of the present invention is that the safety and security system avert unauthorized use of a vehicle.

A further objective of the present invention is that the safety and security system alert the driver for inattentiveness.

Still a further objective of the present invention is that the safety and security system aids in accident prevention through activating precautionary measures due to any distraction or inattentiveness of the driver.

Still a further objective of the present invention is that the safety and security system alerts if an unattended child is left behind in the vehicle.

Still a further objective of the present invention is that the safety and security system provide alerts to an unsuspecting vehicle of a potential collision with the vehicle.

Still a further objective of the present invention is that the safety and security system promptly inform the preconfigured emergency contacts in case of an accident of the vehicle.

Still a further objective of the present invention is that the safety and security system map the path taken by the vehicle and use of the same for navigation.

Another objective of the present invention is that the safety and security system monitor the regular driving pattern of the driver and use the same for determining inattentiveness or drunkenness state of the driver.

Still another objective of the present invention is that the safety and security system use real-time weather data to determine preventive steps for averting any accident.

Still another objective of the present invention is that the safety and security system can control some of accessories of the vehicle, such as music system and height of the seats.

Yet another objective of the present invention is that the safety and security system is economical to manufacture.

DETAILED DESCRIPTION

Certain embodiments of the present invention are directed to a safety and security system for a vehicle.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent Referring to FIG. 1, showing an embodiment of the safety and security system 100 for a vehicle. The system 100 comprises a controlling unit 110 configured to perform one or more methods of the present invention. The controlling unit 110 is electronically connected to multiple sensors S1, S2, S3 . . . Sn. Sensors are installed in the vehicle to determine the state of the driver, the vehicle and the environment of the vehicle. At least one of the sensors is a camera with face recognition capabilities. The camera S1 is installed near the dashboard of the vehicle to capture the face of a driver. Preferably, another camera S2 can also be used, wherein the cameras S1 and S2 together map the three-dimensional head of the drivers and also map the movements of the head. Other sensors S3 . . . Sn can be used to detect the functional state of the vehicle, such as the speed of the vehicle, state of music player, the temperature inside the vehicle, etc. Furthermore, the sensors help to detect the environment of the vehicle, such as an obstacle in the path of the vehicle, another approaching vehicle from the rear side, road condition and type such as highway, etc. Furthermore, at least one camera can be an infrared camera for detecting the presence of a child in the vehicle. The child accidentally left in the vehicle can be detected by the system 100, according to an embodiment of the present invention. The sensors S1, S2 . . . Sn, including cameras are eyes and ear of the controlling unit 110. The controlling unit 110 comprises a processor and a memory, wherein the memory storing a facial recognition algorithm and the artificial intelligence algorithm. Further shown in FIG. 1 is that the controlling unit is electrically connected to a warning unit 120. The warning unit 120 includes beepers and light indicators which are configured to alert the driver of the vehicle. The controlling unit 110 is further connected to the vehicle control unit 130 for controlling one or more functions of the vehicle. As can be seen in the FIGURE, the vehicle control unit 130 is connected to fuel supply of the vehicle, brakes, transmission of the vehicle including clutch and the gears, and if any auto drive 170 installed on the vehicle. The controlling unit 110 through the vehicle control unit 130 controls one or more functions of the vehicle, in case the drive of the vehicle is inattentive. For example, the fuel supply 140 can be decreased to reduce the speed of the vehicle. Similarly, brakes 150 can be automatically applied to slow down the vehicle. Change in gears to lower gear can also reduce the speed of the vehicle. In case, the vehicle is an auto-drive vehicle, the vehicle can be put to auto-drive in case the driver is distracted or inattentive. The controlling unit 110 is further connected to a user device 105 through a cloud network 180. The cloud network 180 can be any commercially known network for connecting electrical devices, such as Bluetooth, WIFI, internet, Broadband, 2G, 3G, 4G, LTE, and 5G. The user device 105 can be a smart phone. The user device 105 can be used to configure the controlling device 110, sending any instruction to the controlling device 110 and receiving any notification from the controlling device 110. The user device 105 and the controlling unit are further connected to a user account 115 through the cloud network 180. The user account 115 includes details of the user, such as name, address, etc.

Safety/Driver Monitoring

In one embodiment, the present invention is directed to safety and security system for a vehicle that alerts an inattentive driver and aids in preventing an accident. The safety and security system include a computing unit, an optical sensor coupled to the computing unit. The computing unit incorporating an operating system, application software, application interface technology and machine learning (AI). One or more vehicle control units and a warning unit coupled to the computing unit. The optical sensor can be positioned in the vehicle such that to capture images of a face of a driver driving the vehicle. In one case, the optical sensor can be positioned on front-side of the vehicle along the lines of where the windshield meets the roof of the vehicle. For example, the optical sensor could be positioned near the rear-view mirror. In a preferred embodiment, more than one optical sensor could be deployed to capture images of the driver from more than one angles. The use of two or more optical sensors may allow three-dimensional imaging of the head of the driver. This could be particularly useful in mapping the head movements of the driver. The computing unit is configured to capture multiple images using one or more optical sensors. The computing unit is configured to use a combination of facial recognition technology and artificial intelligence to analyze the recorded images of the driver. The computing unit analyzes the recorded images in real time to deduce one or more parameters. Thus, the safety and security system according to the present invention continuously monitors the driver for inattentiveness.

The one or more parameters determined by the computing unit are used to judge the attentiveness of the driver. These parameters include, but are not limited to, the position of the head, movements of the head, line of sight position for the head. The computing unit tests each of the determined parameters if they are within the allowed-range or outside the allowed-range and in combination with duration of distraction. For example, artificial intelligence could be taught if which movements of the head are normal and which movements of the head indicate distraction. Similarly, artificial intelligence could be taught to recognize the drunken state of the driver. For example, it is well understood that alcohol affects the facial and eye expression, as well as the balance of the head. The artificial intelligence could be taught to interpret such changes in the behavior of the driver. Like determining the drunken state of the driver, the drowsiness of the driver could also be recognized by the computing unit. In addition, artificial intelligence could also be taught to identify if the driver is under the influence of any narcotics. Thus, based on the one or more determined parameters, the computing unit determines the attentiveness level of the driver while driving the vehicle. In addition, the time period of distraction is also tracked by the computing unit. Suitable timer can be coupled with the computing unit. For example, the National highway traffic safety administration (NHTSA) considers a driver to be distracted only if the driver is not paying attention on the road for more than 3 seconds. Thus, the safety and security system of the vehicle considers the duration of distraction of the driver to determine inattentiveness and take any preventive measures.

Besides the use of facial expressions, the computing unit can also be configured to capture any distracting elements nearby the driver. For example, the presence of a mobile phone in the hand of the driver could be identified by the computing unit. Moreover, the computing unit could infer the interactions of the driver with the distracting element. For example, the computing unit could identify the direction of eyes towards the distracting element and/or, the direction or angle of the head. Alternatively, the computing unit could also identify the movement of the head towards the distracting element and the amount of time it spends in that position or not refocusing on the road ahead. The combination of facial expressions and engagements of the driver with the distracting elements could help in preventing any false alarms.

In case, the driver is inattentive, the computing unit triggers a warning unit. The warning unit can include one or more speakers to generate audio warnings. The audio warning could be in the form of beeps, tones or a recorded message. In one embodiment, the driver could select the type of warning or choose a recorded message from a list of pre-recorded messages. Alternatively, the driver can also record the audio message. Customization of the audio message by the driver may increase the compliance and use of the safety system. In one embodiment, the intensity of the audio warning could vary depending upon the current situation. For example, in a less risky situation, the intensity of the audio warning could be low, while in a riskier situation, the intensity of the audio warning could be intense.

A particular situation may be determined by one or more sensors disposed outside the vehicle. The one or more sensors can include a proximity sensor and an optical sensor. The sensors are configured to identify any obstacle in the path of the vehicle. The obstacle can be anything which can collide with the vehicle. For example, the obstacle can be an adult human, a kid, footpath, divider, pet, cyclist or any other vehicle. The sensors can determine the type of obstacle and the position of the obstacle relative to the vehicle. In one exemplary embodiment, the optical sensor/camera can monitor the size of an obstacle, such as an approaching vehicle and based on the change in size of the obstacle, the distance of the obstacle from the vehicle can be determined. This is based on the principle that an object size increases in size as they get closer and decreases in size as they get farther. The computing unit can be learnt by repeated experiments i.e. observing vehicles at a variety of distances notating the distance in the technology within what is considered low to high risk. The analysis can be used as a reference in actual determination of the risk. Autonomous vehicles (auto-driving vehicles) are generally equipped with such sensors that detect the environment of the vehicle for its autonomous navigation. In case, there is no obstacle in the path of the vehicle, the particular situation may be marked less risky. In another case, if the obstacle is present far from the vehicle, the situation can be marked as medium risky. In case, the obstacle is near the vehicle, the particular situation can be marked of high risk.

In addition to triggering the warning unit, the computing unit is also configured to control some of the functions of the vehicle, such as the speed of the vehicle. To control any function of the vehicle, one or more vehicle control units are coupled to the computing unit. In one case, the vehicle control unit is configured to alter the acceleration of the vehicle by decreasing the fuel supply. Thus, the vehicle will be slowed down even when the gas pedal is in the state of fully pressed by the driver. The speed of the vehicle can also be reduced by applying brakes. The vehicles are generally provided with automatic emergency braking system (AEB). The AEB can be deployed by the present invention to decrease the speed of the vehicle. In addition, the speed of the vehicle can be reduced by shifting the gears down. Combination of brakes and gears in proper proportion can help to smoothly reduce the speed up a car in a shortest possible time. In general, drivers use different skill sets to reduce the speed of the vehicle. Skill sets of one driver maybe better than others. The system according to the present invention can be learnt these skill sets. In one case the system of present invention causes engine of the vehicle to get two quick automatic revs between shifting from one higher gear to a lower gear while simultaneously applying the braking. This method is popularly known as "Heel Toe Double Clutch Down Shifting." This not only reduces the speed of the vehicle but also produces a slight noticeable drag/pull due. The drag/pull and simultaneous reduction in the speed of the vehicle also alerts the distracted driver. The system will reduce the speed to a safe driving speed but not too low of a speed that it could cause an accident. Sudden reduction in speed may cause a head to tail collision with any other vehicle. The system though its sensors and navigation capabilities can detect the environment and the type of road on which vehicle is running to determine safe driving speed. For example, on an highway, the system may not reduce the speed of the vehicle below 50 mph. This is because on highway, the vehicles run at high speeds. Reduction of speed to low level may cause an accident. Alternatively, the system may engage the autonomous system of the vehicle. The similar precautionary measure could be taken by the control unit when the driver is sleepy. The security system can also tighten the seat belt of the distracted driver.

The computing unit is also configured to automatically restore the functions of the vehicle to the driver once the driver refocuses on the road. The computing unit controls the operation of the vehicle as a precautionary measure to avoid any collision with the obstacle. For example, in one case, the obstacle is at a safe distance from the vehicle and the state of the driver is distracted. In this case, the control unit can reduce the speed of the vehicle as a precautionary measure. Due to the decreased speed of the vehicle, the driver has more time to regain the attentiveness. In another case, the obstacle is at a safe distance from the vehicle and the state of the driver is distracted. In this case, the control unit can engage the autonomous system of the vehicle to auto-drive the vehicle. The autonomous system can thereafter safely avert the potential accident. The control unit also monitors the behaviors of the driver over a predetermined time period. For example, when the driven is in a drunken state and driving the vehicle erratically. In such a situation and depending upon the state of erratic driving, the control unit may jam the vehicle and or limit the speed of the vehicle.

The system using the machine learning process can be taught how to respond in emergency situations. The data for machine learning of the system can be obtained from real accidents and potential accidents averted by the driver. For example, the details of an accident in California, including the cause of accident, reaction of the driver and other data related to the accident. Such details could be used to learn the system of the present invention so that the system can safely handle the vehicle if similar situation reoccur. It is important for the system to learn how to avoid a potential accident. Machine learning of the system using data from past accidents or potential past accidents and experiences of the drivers of such vehicles can be employed according to the present invention.

The safety and security system according to the present invention also determine the environment of the vehicle in real time for any preventive action taken by the vehicle. The environment includes weather data, traffic signal, type of road: street or highway etc. The safety and security system using sensors positioned outside of the vehicle to determine the weather in real time. The system can consider the weather data while taking the preventing actions. Similarly, the system can determine the other environment conditions, such as road type, congestion on the road, any traffic signals. Such data may be determined using optical sensors and navigations system. Thus, in case the traffic signal is red, preventive measure can be taken by the system if the driver is in attentive.

In other words, the safety and security system according to the present invention is a third eye to the driver. So, the third eye warns the driver for being inattentive, negligent or careless. The system is now acting as one of the eyes of the driver; it is watching the driver action, watching the road and performing the actions that a driver would have done, had he been watching the road and something unexpected occurred. The third eye monitors the environment of vehicle in real time, including the weather, road type, congestion on the road and traffic signals. The third eye takes preventive measure to avert any accident and reach the vehicle safely to its destination.

Alerting an Emergency Contact in Case of Accident

Besides taking all the precautionary measures, sometimes the accidents are unavoidable. In such a case, the safety and security system according to the present invention can broadcast S.O.S message to the owner's emergency contacts. The safety and security system can also inform the emergency contacts with the severity and location of the accident. For such functionality, the safety and security system may be connected to network communication, such as 2G or 3G coupled with an accelerometer and GPS to determine impact and ID location. In addition, the safety and security system can be configured with the emergency contact details any other configurations, such as choice of the warning message, the safety and security system can be connected to a user device. Emergency contact details may include the contact of family members, friends, paramedics, or any other organization taking care of road accidents. The computing can also be configured to take audio instructions. The user device could be a smartphone, tablet computer, smart-watch and like. In one case, a suitable name can be assigned to the vehicle and the driver can interact with the computing unit through voice. The computing unit can take audio instructions, as well as generate audio responses. Apart from emergency message, the system according to the present invention can also send vital details of the injured driver to concern health authorities.

Communication Hub

The safety and security system according to the present invention can communicate with nearby vehicles, also known as vehicle to vehicle (V2V) communication. The system will know if any other vehicle is approaching the subject vehicle or passes by the subject vehicle. In short, the system can form a hub with nearby vehicles, wherein the vehicles can communicate with each other. The purpose of such a communication hub is to alerts member vehicles. For example, in case the driver is distracted, and an unsuspected vehicle is approaching the subject vehicle which may cause the two vehicles to collide, the safety and security system can prepare for the preventive action. The communication hub can also be used to send emergency messages to nearby vehicles. The communication hub causes the vehicle to activate its precautionary measures like tightening seatbelt among other life or injury preventive measures. The safety and security systems installed in the vehicles could be connected by a network, preferably the network is a cloud network.

Anti-Theft Solution

In second embodiment, the safety and security system according to the present invention can have added functionality of preventing unauthorized use of the vehicle. For example, the system can be configured by the owner to authorize the use of the vehicle based on date, time, user etc. The owner using his/her mobile device can configure the system. The owner can register a list of authorized users that can use the vehicle to include but limited to time, days, and/or, date of use. For example, a particular person can be authorized to drive the vehicle on a particular date and for specific duration of time. Such authorization can be in negative also, for example, a person cannot drive the vehicle on weekend or after 1 am. For registration, the safety and security system record the biometric data of the authorized users. The biometric data may include facial or retina scan details of the authorized users. Additionally, a profile of the users can be creating which may include name, date of birth, age, gender and like of the users. In case, any unauthorized user tries to turn the ignition ON, the safety and security system can kill the ignition. Alternatively, each time the vehicle is placed in driver or reverse, the system can check to authenticate the driver and see if they are allowed to operate the vehicle. If the driver is not recognized, a photo of the driver will be sent to the owner phone and at that time the owner can authorize that driver to operate the vehicle or allow the vehicle to shut down at the predetermined time that was programmed. This will operate like a kill switch which turn off the engine of the vehicle, and which remains off until activated by the owner. The system may also allow the owner to reset the system through his phone on the cloud, which will allow him to authenticate himself by using the facial recognition technology to authorize operation or a secured code. The secured code can be a random code generated based on prestored algorithm. Token systems are known that generates random code each time based on algorithm. These codes can be used to remotely authenticate the use of the vehicle by an unregistered person. In another case, a warning message about unauthorized access to the vehicle can also be sent to the user device. The user can also be presented with an option to allow the use of the vehicle, in case the person is permitted by the user to drive the vehicle. In one case, the user device can be configured with an anti-theft token generating app. The user can generate the token in real time and input the same in the user device to grant permission to use the vehicle by an authorized person. The token system generates random codes that is sent to user's registered device instead of a fixed assigned password. This help to increase security, since the fixed passwords can be stolen or hacked. To further secure the vehicle against theft, the computing unit may be coupled with an internal GPS locator chip. The location of the vehicle can be tracked in real time by the user. Furthermore, to safeguard the system from hacking, such as thief entering codes, the system may limit the number of entries. For example, a user may try a code up to five unsuccessful attempts that thereafter a distress signal may be sent to the owner. The distress signal shall indicate that there is unauthorized forced access into the vehicle. The distress signal can be in the form of a text or a phone call. The owner in response may authorize the use of the vehicle through his mobile device.

In another exemplary embodiment, the system can also allow the owner to activate a kill code from his phone that operates remotely that will render the vehicle useless. In case of new owner of the vehicle, the old owner may transfer the ownership to the new owner, which may reset all previous codes. For example, the system can be updated through a registered mobile phone. Furthermore, for precautionary measures, in case some fault occurs with the security system, the owner can call a predetermine number, enter an access code, and the backup system will send the vehicle an override code to reset the system. To further secure the system from hacking, additional security measures such as prestored questions can be used to authenticate if owner is communicating with backup system. For example, the owner must enter name of sales agent, dealer, payment amount, bank name and like to authenticate himself. Furthermore info regarding reset of system can be notified on registered device of the owner.

Also, due to automated locking of the vehicle, cases of the vehicle getting locked with the keys (or vehicle is ON) inside, while the driver is outside are common. In other words, the authorized person or owner gets locked out of the vehicle. The present invention can provide entry of the owner locked out of the vehicle. In such scenario the owner can place a call to an assigned automated number within the safety and security authentication system of the present invention and authenticate himself by providing preconfigured details such as facial recognition or any personal information including the name of the sales agent, payment amount, middle name of any family member etc. On successful verification of the owner, the system according to the present invention can open the vehicle and the owner can get inside the vehicle.

Child Safety Solution

In a third embodiment, the safety and security system could detect the presence of an unattended child/infant or a kid. It may happen that a child is left in the vehicle and the vehicle is locked. This generally happened when the child is seated in the infant seat and the parents forget about the child. The safety and security system can recognize if a child is left in the vehicle and also detect the temperature inside the vehicle. Camera installed in the vehicle according to the present invention can be used to detect the presence of child. Sometimes, the child seat may not be in range of the camera, for example the driver seat may be an obstruction and the camera cannot view the child seat behind the drive seat. To overcome such a possibility, a combination of cameras is preferred in the present invention. Second camera having thermal imaging capabilities, such as an infrared camera can be used in combination with another normal camera. The thermal imaging system can detect the child based on body heat and thus useful even in dark.

Moreover, the system may also determine the age of the child and based on the age may evaluate the risk level. In case, the temperature of the vehicle is above or below the normal temperature range, the safety and security system can be set to automatically start the vehicle along with the air conditioning system or heat, adjusting the temperature to be within the safe temperature range. In addition, alerts can be sent to the user device that an unattended child is detected in the vehicle.

Furthermore, the owner can input name, DOB, gender, and the system will assign a risk level based on age of the child. Once in the system, each time the car is turned off and has been inactive for 5 minutes, it will automatically be activated to take a photo of the interior and or record, trying to locate that risk that was assigned to the vehicle. In case, the risk is present, and identified by the system, it will send that data to the owner with an alert, along with the inside temperature of the vehicle, its location, the ability to remotely start the vehicle and turn the camera in the vehicle ON to communicate with the child and activate the air conditioning. The owner can remotely through the system of present invention can start the vehicle and set the temperature of the vehicle to be within safe temperature range. However, the system as described above can automatically take the safety measures, such as changing temperature of the vehicle to safe levels, calling 911 etc. This can be particularly helpful when the notification is not seen by the receiver. For example, the owner may be busy and does not check his mobile phone. The owner can however override the automatic control, in case he sees the notification on time.

Map the Path Taken by the Vehicle

In a fourth embodiment, the safety and security system can be configured to map the path taken by the vehicle and the store the same in the memory. The mapped path can be used for navigation by the vehicle. This can be particularly useful when the driver gets lost and unable to follow back the same route. Also, the GPS of the vehicle may show a different route to reach the destination, but not the same route that landed the driver to a wrong place. The driver may want to return to old route which he was following before taking the wrong turn. The system records and tracks the last ten miles of driving using virtual landmarks that is produced by the present system to remember its exact direction, just in case, the driver gets lost and need that exact detailed turn by turn direction. The virtual markers could be placed by the system every 50 meters.

Additional Features

In a fifth embodiment, the safety and security system can control some basic functions of the vehicle, such as adjusting the rear mirror, side mirrors, audio/video system of the vehicle, adjustment of conditioning system of the vehicle, positioning of the seats, steering height etc.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed. The one or more functions can be controlled by giving audio instructions to the safety and security system. Thus, the safety and security system not only make the ride safer, but also comfortable.

What is claimed is:

1. A safety and security system comprising:
    a computing unit;
    two or more optical sensors in electronic communication with the computing unit, the optical sensors configured for facial recognition, the optical sensors positioned in a vehicle to capture a face and head movements of a driver, the computing unit configured to access data from the optical sensors for:
        three-dimensional imaging of a head of the driver and mapping head movements,
        distinguishing the head movements as normal or distracted,
        determining a line of sight of the driver,
        determining a drunken state of the drive,
        determining a drowsiness state of the driver,
        identifying a distracting element in a vicinity of the driver,
        determining an interaction of the driver with the distracting element, the interaction comprises directions of eyes and the head towards the distracting element,
    a warning unit coupled to the computing unit; and
    one or more vehicle controlling units operably coupled to the computing unit, the one or more vehicle controlling units configured to perform functions comprising:
        reducing a speed of the vehicle,
        automatically shifting to a lower gear,
        deploying an emergency braking system of the vehicle,
        decreasing a fuel supply independently of a state of a gas pedal to slow down the vehicle, and
        engaging an autonomous system of the vehicle for auto-driving;
        wherein the computing unit is configured to trigger the warning unit and the one or more vehicle controlling units upon detecting distracted driving.

2. The safety and security system of claim 1, wherein the computing unit is further configured to:
    receive a list of users authorized to drive the vehicle,
    receive details of days in which each user of the list of users can drive the vehicle, and
    identify, based on facial or retinal features, operation of the vehicle by an unauthorized person, and
    upon identifying the unauthorized person, disable the vehicle.

3. The safety and security system of claim 2, wherein the computing unit is further configured to allow an owner to remotely disable the vehicle.

4. The safety and security system of claim 1, wherein the warning unit comprises a speaker.

5. The safety and security system of claim 1, wherein the safety and security system further comprises a camera, the camera configured to detect a position of an obstacle in a path of the vehicle, the camera coupled to the computing unit, wherein the computing unit configured to trigger the one or more vehicle controlling units based on the position of the obstacle and distracted driving.

6. The safety and security system of claim 5, wherein the computing unit is configured to monitor behavior of the driver in the drunken state over a predetermined period, and upon detecting an erratic driving.

7. The safety and security system of claim 5, wherein the one or more vehicle controlling units is configured to tighten a seat belt of the driver.

8. The safety and security system of claim 1, wherein the computing unit is further configured to:
    detect a presence of an unattended child in the vehicle;
    measure a temperature inside the vehicle;
    turn on a conditioning system of the vehicle, in case the temperature is above a normal range of temperature; and
    send an alert to a user device.

9. The safety and security system of claim 1, wherein the computing unit is further configured to:
    map a path taken by the vehicle from a first place to a second place,
    store the mapped path in a memory, and
    navigate from the second place to the first place using the stored mapped path.

10. The safety and security system of claim 1, wherein the computing unit is further configured to:
    store one or more emergency contact details; and
    send alerts in case of an accident of the vehicle to the one or more emergency contact details; and
    send vital details of the driver to a concerted authority.

11. The safety and security system of claim 1, wherein the safety and security system further comprise a GPS tracker.

12. The safety and security system of claim 1, wherein the computing unit further controls mirror settings of the vehicle.

13. The safety and security system of claim 1, wherein the computing unit further controls positioning of seats of the vehicle.

14. The safety and security system of claim 1, wherein the computing unit further controls air-conditioning of the vehicle.

15. The safety and security system of claim 1, wherein the computing unit further controls an audio/video system of the vehicle.

* * * * *